United States Patent
Benveniste

(12) 
(10) Patent No.: US 7,324,491 B1
(45) Date of Patent: Jan. 29, 2008

(54) METHOD AND APPARATUS FOR OVER-THE-AIR BANDWIDTH RESERVATIONS IN WIRELESS NETWORKS

(75) Inventor: Mathilde Benveniste, South Orange, NJ (US)

(73) Assignee: Avaya Technology LLC, Basking Ridge, NJ (US)

( * ) Notice: Subject to any disclaimer, the term of this patent is extended or adjusted under 35 U.S.C. 154(b) by 610 days.

(21) Appl. No.: 10/978,072

(22) Filed: Oct. 28, 2004

Related U.S. Application Data

(60) Provisional application No. 60/514,904, filed on Oct. 29, 2003.

(51) Int. Cl.
  *H04Q 7/24* (2006.01)
  *H04L 12/413* (2006.01)
  *H04J 3/16* (2006.01)

(52) U.S. Cl. .................. 370/338; 370/445; 370/465

(58) Field of Classification Search ............... None
  See application file for complete search history.

(56) References Cited

U.S. PATENT DOCUMENTS

| | | | |
|---|---|---|---|
| 6,917,598 B1* | 7/2005 | Emeott et al. | 370/311 |
| 7,031,287 B1* | 4/2006 | Ho et al. | 370/338 |
| 7,068,632 B1* | 6/2006 | Ho et al. | 370/338 |
| 7,151,762 B1* | 12/2006 | Ho et al. | 370/338 |
| 2003/0161340 A1* | 8/2003 | Sherman | 370/445 |
| 2003/0223365 A1* | 12/2003 | Kowalski | 370/230.1 |
| 2004/0151150 A1* | 8/2004 | Kubler et al. | 370/338 |
| 2004/0228330 A1* | 11/2004 | Kubler et al. | 370/352 |
| 2005/0135295 A1* | 6/2005 | Walton et al. | 370/328 |
| 2005/0174973 A1* | 8/2005 | Kandala et al. | 370/338 |
| 2006/0098604 A1* | 5/2006 | Flammer et al. | 370/337 |
| 2007/0058581 A1* | 3/2007 | Benveniste | 370/328 |

* cited by examiner

*Primary Examiner*—Andrew C. Lee
(74) *Attorney, Agent, or Firm*—John C. Moran

(57) ABSTRACT

Embodiments control access to a wireless network providing communication for wireless traffic and controlled by a wireless access point to assure quality of service for designated traffic by assigning all communication of the designated traffic to use one of the priorities on the wireless network, requiring that ones of the wireless traffic wanting to communicate using the one of the priorities and higher ones of the priorities and using a distributed medium access protocol submit bandwidth reservation requests to the wireless access point, granting a bandwidth reservation to one of the wireless traffic for communication by the wireless access point in response to a bandwidth reservation request upon bandwidth being available on the wireless network, and allowing other ones of the wireless traffic to communicate using lower ones of the priorities without requiring bandwidth reservation requests.

55 Claims, 6 Drawing Sheets

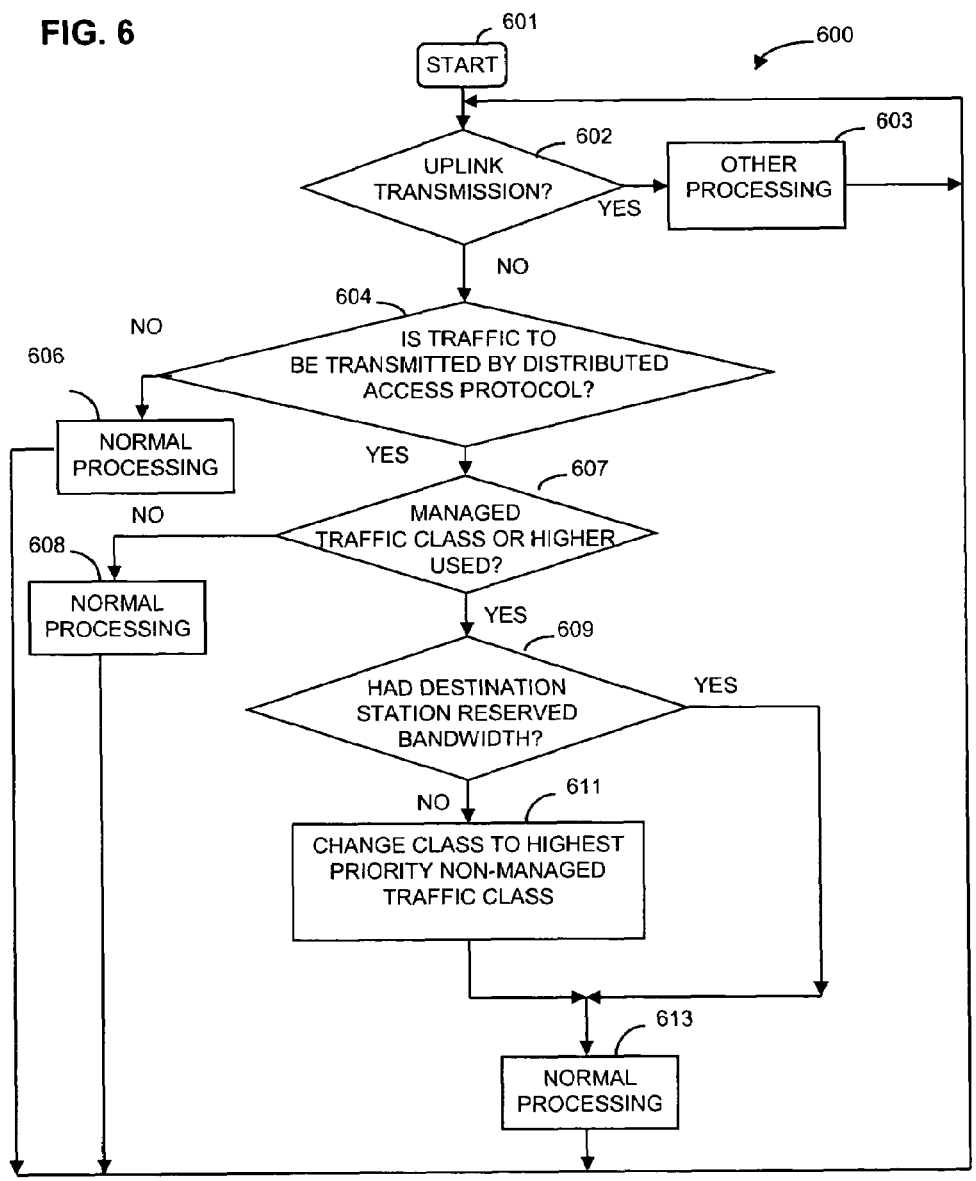

METHOD AND APPARATUS FOR OVER-THE-AIR BANDWIDTH RESERVATIONS IN WIRELESS NETWORKS

REFERENCE TO RELATED APPLICATIONS

This application claims the benefit of U.S. Provisional Patent Application Ser. No. 60/514,904, filed Oct. 29, 2003, entitled "Over-the-Air Bandwidth Reservations in Wireless LANs", which is also incorporated by reference.

TECHNICAL FIELD

The present invention relates to telecommunication in general and, more particularly, to local area networks.

BACKGROUND

In the prior art, it is known to use a wireless LAN (WLAN) in time-sensitive applications where it is necessary to assure quality of service (QoS). Examples of such time-sensitive applications involve communication by devices such as multimedia devices, telecommunication devices, etc. over a WLAN. A well known problem with voice-over-IP (VoIP) transmission for telecommunication is that of assuring QoS during the duration of the telecommunication call. The use of a WLAN increases the problem of assuring QoS. This is because the bandwidth of a WLAN is more limited than that of a wired LANs and other packet transmission systems. This is particularly true if the WLAN is operating in an unlicensed radio frequency (RF) spectrum. Hence, it is important to implement bandwidth management and reservation control on a WLAN that is communicating VoIP data as well as other data, and to couple management and reservation control with admission control to the use of the WLAN.

SUMMARY OF THE INVENTION

Embodiments of methods and apparatus control access to a wireless network providing communication for wireless traffic and controlled by a wireless access point to assure quality of service for designated traffic by assigning all communication of the designated traffic to use one of the priorities on the wireless network, requiring that ones of the wireless traffic wanting to communicate using the one of the priorities and higher ones of the priorities and using a distributed medium access protocol submit bandwidth reservation requests to the wireless access point, receiving a bandwidth reservation by one of the wireless traffic for communication from the wireless access point in response to a bandwidth reservation request upon bandwidth being available on the wireless network, and communicating by other ones of the wireless traffic using lower ones of the priorities without requiring bandwidth reservation requests.

Other embodiments of methods and apparatus allow controlling access by a wireless access point to a wireless shared communication channel for a plurality of wireless traffic to assure quality of service for managed traffic by designating one of a plurality of priorities to be used by a first set of the plurality of wireless traffic communicating managed traffic where access to the wireless shared communication channel is determined by the plurality of priorities; by using by a second set of the plurality of wireless traffic ones of the plurality of priorities higher than the designated one of the plurality of priorities; by requiring the first and second sets of the plurality of wireless traffic using a distributed medium access protocol to submit bandwidth reservation requests to the wireless access point for access to the wireless shared communication channel; by granting by the wireless access point access to one of the first set of the plurality of wireless traffic in response to a bandwidth reservation request upon bandwidth being available on the wireless shared communication channel; and by allowing access to the wireless shared communication channel by a third set of the plurality of wireless traffic using ones of the plurality of priorities lower than the designated one of the plurality of priorities without submitting bandwidth reservation requests.

BRIEF DESCRIPTION OF THE DRAWING

FIG. 6 illustrates, in flowchart form, an embodiment of operations performed by an access point.

DETAILED DESCRIPTION

Figure 1:
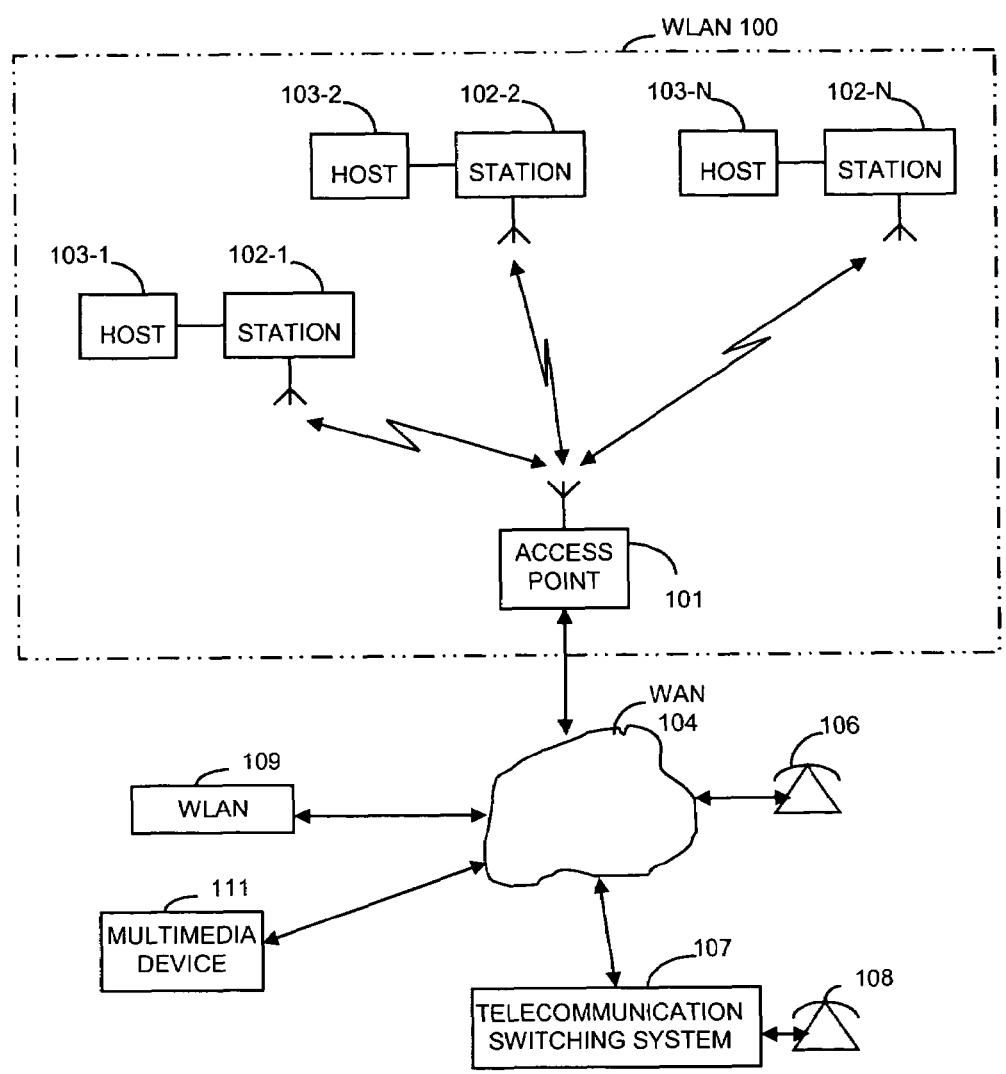
FIG. 1 illustrates, in block diagram form, an embodiment of a system.

FIG. 1 depicts a block diagram of local-area network 100 interconnected to a variety of QoS sensitive devices and other networks via wide area network (WAN) 104 in accordance with an embodiment. (WAN 104 is also referred to as a backbone network and as the distribution system by those skilled in the art.) Local-area network 100 comprises access point 101, stations 102-1 through 102-N, wherein it is a positive integer in the set {1, . . . N}, and hosts 103-1 through 103-N, interconnected as shown. As shown in FIG. 1, station 102-$i$ enables host 103-$i$ to communicate wirelessly with other hosts in local-area network 100 via access point 101. Stations 102-1 through 102-N are each capable of supporting multiple traffic streams. Host 103-$i$ is a device (e.g., a telecommunication terminal, a computer, a personal digital assistant, a printer, CD player, VCR player, DVD player, video camera, etc.) that is capable of generating and transmitting data to station 102-$i$. Host 103-$i$ is also capable of receiving, processing, and using the data received from station 102-$i$. It will be clear to those skilled in the art how to make and use host 103-$i$. Further, it would be clear that station 102-$i$ and host 103-$i$ could be one integrated unit. The greater details of station 102-$i$ are described below and with respect to FIG. 3. The greater details of access point 101 are described below and with respect to FIG. 2.

Access point 101 and stations 102-1 through 102-N transmit blocks of data called frames. A frame typically comprises a data portion, referred to as a data payload, and a control portion, referred to as a header. Frames transmitted from station 102-$i$ to access point 101 are referred to as uplink frames, and frames transmitted from access point 101 to station 102-$i$ are referred to as downlink frames. A series of frames transmitted from station 102-$i$ to access point 101 are referred to as an uplink traffic stream, and a series of frames transmitted from access point 101 to station 102-$i$ are referred to as a downlink traffic stream.

Access point 101 and stations 102-1 through 102-N transmit frames over a shared-communications channel such that if two or more stations (or an access point and a station)

transmit frames simultaneously, then one or more of the frames can become corrupted (resulting from a collision).

Consequently, local-area networks typically employ protocols, known as media access control (MAC) protocols, for ensuring that a station or access point can gain exclusive access to the shared-communications channel for an interval of time in order to transmit one or more frames.

To provide external telecommunication service for WLAN 100, access point 101 may be interconnected via WAN 104 to one or more telecommunication switching systems such as telecommunication switching system 107 to which telecommunication terminals, such as telecommunication terminal 108, are connected. In addition, telecommunication service may be provided via WAN 104 to telecommunication terminals, such as telecommunication terminal 106, that may be implementing the VoIP protocol connected to WAN 104. In addition, telecommunication service maybe provided to telecommunication devices supported by WLAN 109. These types of services are well known to those skilled in the art.

To provide external multimedia service for WLAN 100, access point 101 may be interconnected via WAN 104 to one or more multimedia devices, such as multimedia device 111. These multimedia devices maybe any type known to those skilled in the art for providing multimedia.

MAC protocols as used in WLANs 100 and 109 can be classified into two types: distributed protocols, and polling protocols. In a distributed protocol, stations 102-1 through 102-N and access point 101 compete to gain exclusive access to the shared-communications channel. In a polling protocol, access point 101 polls stations 102-1 through 102-N and determines which station gains access to the channel. The protocols may be used together.

Figure 2:
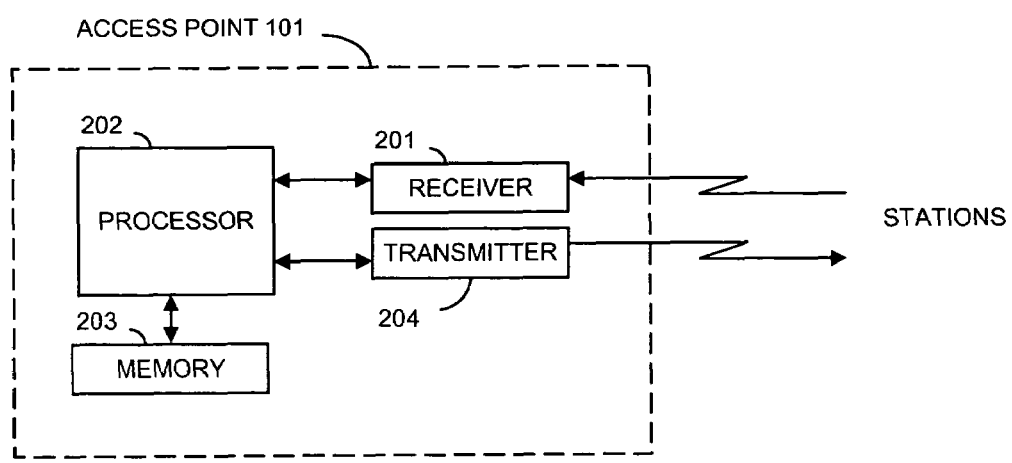
FIG. 2 illustrates, in block diagram form, an embodiment of an access point.

FIG. 2 depicts a block diagram of the components of access point 101 in accordance with the illustrative embodiment of the present invention. Access point 101 comprises receiver 201, processor 202, memory 203, and transmitter 204, interconnected as shown.

Receiver 201 is a circuit that is capable of receiving frames from the shared communications channel, in well-known fashion, and of forwarding them to processor 202. It will be clear to those skilled in the art how to make and use receiver 201.

Processor 202 is a general-purpose processor that is capable of executing instructions stored in memory 203, of reading data from and writing data into memory 203, and of executing the tasks described below and with respect to FIG. 5. In some alternative embodiments of the present invention, processor 202 is a special-purpose processor (e.g., a network processor, etc.). In either case, it will be clear to those skilled in the art, after reading this disclosure, how to make and use processor 202.

Memory 203 is capable of storing programs and data used by processor 202, as is well-known in the art, and might be any combination of random-access memory (RAM), flash memory, disk drive, etc. It will be clear to those skilled in the art, after reading this specification, how to make and use memory 203.

Transmitter 204 is a circuit that is capable of receiving frames from processor 202, in well-known fashion, and of transmitting them on the shared communications channel. It will be clear to those skilled in the art how to make and use transmitter 204.

Figure 3:
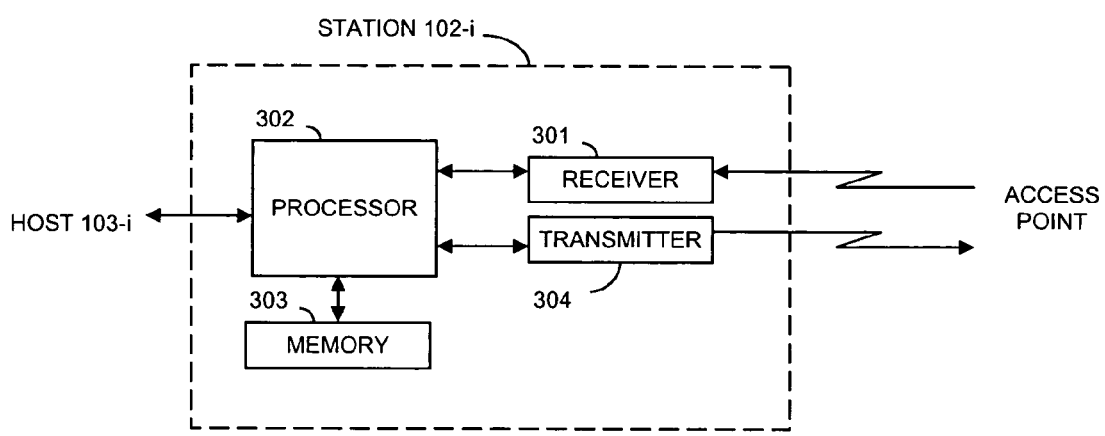
FIG. 3 illustrates, in block diagram form, an embodiment of a station.

FIG. 3 depicts a block diagram of the components of station 102-i. Station 102-i comprises receiver 301, processor 302, memory 303, and transmitter 304, interconnected as shown.

Receiver 301 is a circuit that is capable of receiving frames from the shared communications channel, in well-known fashion, and of forwarding them to processor 302. It will be clear to those skilled in the art how to make and use receiver 301.

Processor 302 is a general-purpose processor that is capable of executing instructions stored in memory 303, of reading data from and writing data into memory 303, and of executing the tasks described below and with respect to FIG. 4. In some alternative embodiments of the present invention, processor 302 is a special-purpose processor (e.g., a network processor, etc.). In either case, it will be clear to those skilled in the art, after reading this disclosure, how to make and use processor 302.

Memory 303 is capable of storing programs and data used by processor 302, as is well-known in the art, and might be any combination of random-access memory (RAM), flash memory, disk drive, etc. It will be clear to those skilled in the art, after reading this specification, how to make and use memory 303.

Transmitter 304 is a circuit that is capable of receiving frames from processor 302, in well-known fashion, and of transmitting them on the shared communications channel. It will be clear to those skilled in the art how to make and use transmitter 304.

In this embodiment, access point 101 and stations 102-1 through 102-N operate in accordance with the draft IEEE 802.11e standard, a version of the 802.11 standard, that supports quality-of-service (QoS) and allows both a polling protocol (EPCF or HCCA) or a distributed protocol (EDCF or EDCA) that is based on CSMA/CA and TCMA. (The draft IEEE 802.11e standard is hereby incorporated by reference.) In polling, station 102-i transmits a polling request to access point 101 in combination with a traffic specification (TSPEC) that characterizes, via a plurality of fields, traffic generated by station 102-i.

In the distributed protocol, access is provided by sensing the shared communication channel for idle periods before transmission is attempted. Contention is avoided by requiring the idle period length to vary randomly. TCMA enables QoS by prioritizing access to the shared communication channel according to the priority of the traffic. Several mechanisms have been proposed to enhance access prioritization; the main mechanism for differentiation is the use of the arbitration time. Arbitration time is the time a station with frames awaiting transmissions delays access and back-off countdown once the shared communication channel becomes idle. This time interval, arbitration-time inter-frame (AIFS), in the draft 802.11e standard, is different for different traffic priorities, longer for lower priorities. The access point may access the shared communication channel following a busy period after the expiration of a time interval that is shorter than the shortest arbitration time for station channel access. Because the access point can access the channel following a busy period sooner than any station, polling access has precedence over all distributed access traffic classes.

As proposed by the draft 802.11e standard, management of the limited bandwidth of a WLAN can be achieved via the MAC layer signaling. The management of the limited bandwidth involves the submission of bandwidth reservation requests by the stations. These requests are referred to as TSPEC requests. The station specifies in the TSPEC the data rate, or channel time, required for transmission of data associated with either an uplink or a downlink data stream. If there is sufficient bandwidth available for commitment to the TSPEC, the access point will notify the station and reserve the needed bandwidth until termination of the traffic stream. The draft 802.11e standard requires all stations accessing the WLAN via HCCA to submit TSPEC requests, but it does not require all stations accessing the WLAN via the EDCA MAC protocol to submit TSPEC requests for bandwidth management even though some stations may be submitting TSPEC requests.

In one embodiment of the invention, it is not necessary for all stations accessing the WLAN via the EDCA MAC protocol to submit TSPEC requests for bandwidth management to be effected. Prioritized access in conjunction with bandwidth reservation can provide adequate QoS to stations generating recurring periodic data streams such as VoIP calls without mandating the submission of TSPEC requests by all stations. The embodiment only requires that stations in the priority class that are communicating the VoIP calls (referred to as the managed traffic class) and all classes with higher priorities than the managed traffic class submit TSPEC requests. Where both polled access and distributed access are being used, it suffices for stations using EDCA with QoS-sensitive applications in the managed traffic class and in classes of higher priority and stations using polled access to submit TSPEC requests for bandwidth reservations. Since polled access has precedence over distributed access, QoS can be achieved with polled access even if the stations not using this access method fail to submit TSPEC requests. Of course all stations using polled access must abide by the distribution of the admitted TSPEC requests at the access point. Stations using EDCA to send traffic in classes with priority below that of the managed traffic class are then not required to submit TSPEC requests.

For stations not submitting TSPEC requests, these stations must demote the priority of their uplink traffic to a priority class that is below the managed traffic class. The embodiment will demote any downlink frames being sent to a station that is in a non-managed traffic class to be demoted to the highest priority non-managed traffic class.

Since the 802.11e draft standard is compatible with the existing 1999 802.11 standard, another embodiment of the invention makes provisions for handling the traffic of stations compliant with the older standard, often referred to as "legacy" stations. The access mechanism used by legacy stations causes them to send traffic with access parameters comparable to those of the best-effort (BE) traffic class. So, even though they may have high-priority traffic such as VoIP traffic stream to send uplink, the voice frames are transmitted uplink in the BE traffic class. The embodiment provides that if the BE class is designated as not requiring admission control, it will be sufficient to demote the downlink frames destined to the legacy station to a BE class for bandwidth reservation to work effectively for other stations. Alternatively, the embodiment allows the downlink frames destined to a legacy station to be demoted to the highest priority non-managed traffic class of lower or equal priority.

Figure 4:
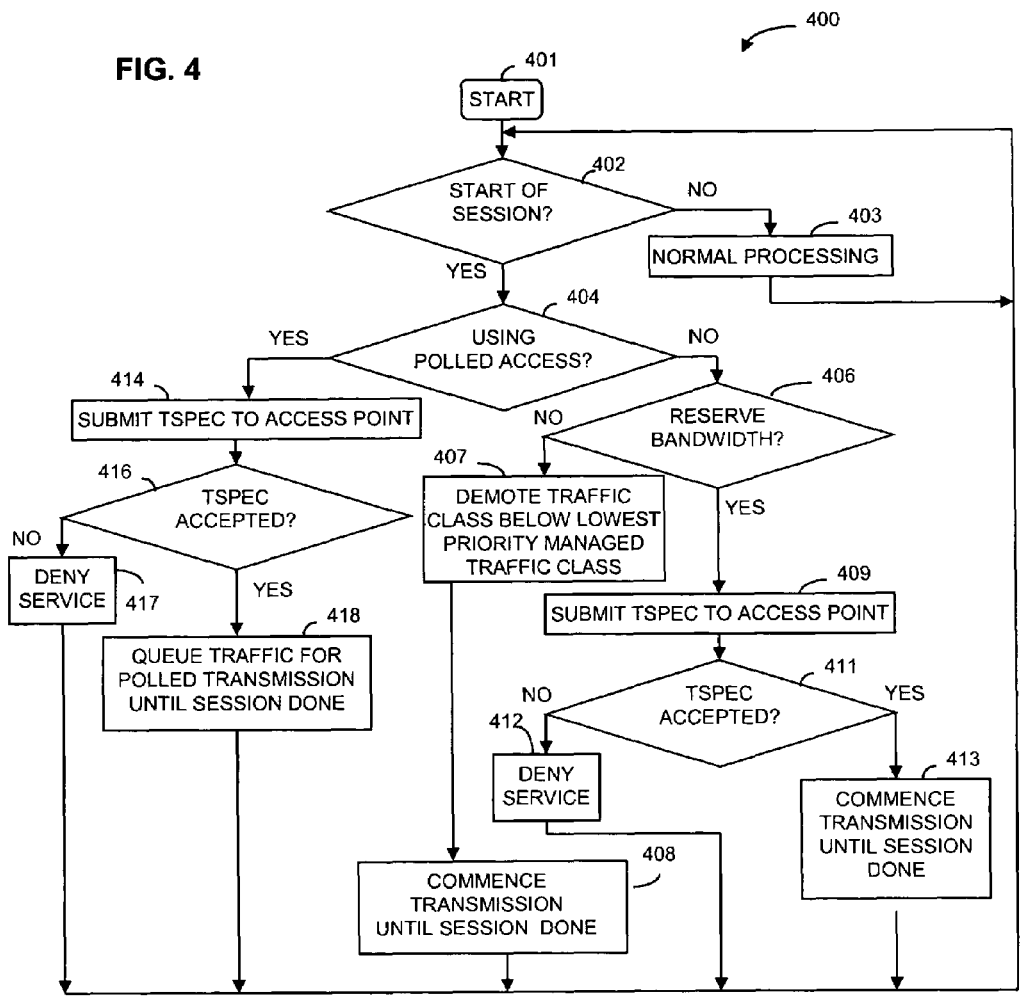
FIG. 4 illustrates, in flowchart form, an embodiment of operations performed by a station.

FIG. 4 illustrates, in flowchart form, operations 400 that are performed by a station such as stations 102-1 through 102-N. After being started in block 401, decision block 402 determines if a start of a new session is occurring. If the answer is no, normal processing not related to a new session is performed by block 403 before control is returned to decision block 402.

If the answer is yes in decision block 402, decision block 404 determines whether polled or contention access will be utilized. If polled access is not to be utilized, control is transferred to decision block 406 since contention access will be utilized. Decision block 406 determines if bandwidth is to be reserved for the transmission. If the answer is no, block 407 demotes the traffic class that will be utilized for this transmission to be below the lowest priority managed traffic class. Block 408 then commences transmission before returning control to decision block 402.

Returning to decision block 406, if bandwidth is to be requested, block 409 submits a request with a TSPEC to access point 101 before transferring control to decision block 411. Decision block 411 determines if the access point has accepted the reservation as specified by the TSPEC. If the answer is no, the station denies the host service in block 412 before returning control back to decision block 402. If the answer is yes in decision block 411, block 413 will commence and continue transmission of frames until the session is done. After the session is done, control is returned back to decision block 402.

Returning to decision block 404, if polled access is to be utilized, control is transferred to block 414 which transmits a request with TSPEC to the access point. Decision block 416 then determines if the access point accepted the TSPEC. If the answer is no, block 417 denies service to the host before transferring control to decision block 402. If the answer in decision block 416 is yes, block 418 queues frames and transmits them in response to polls from the access point until the session is done. After the session is done, control is returned back to decision block 402.

Figure 5:
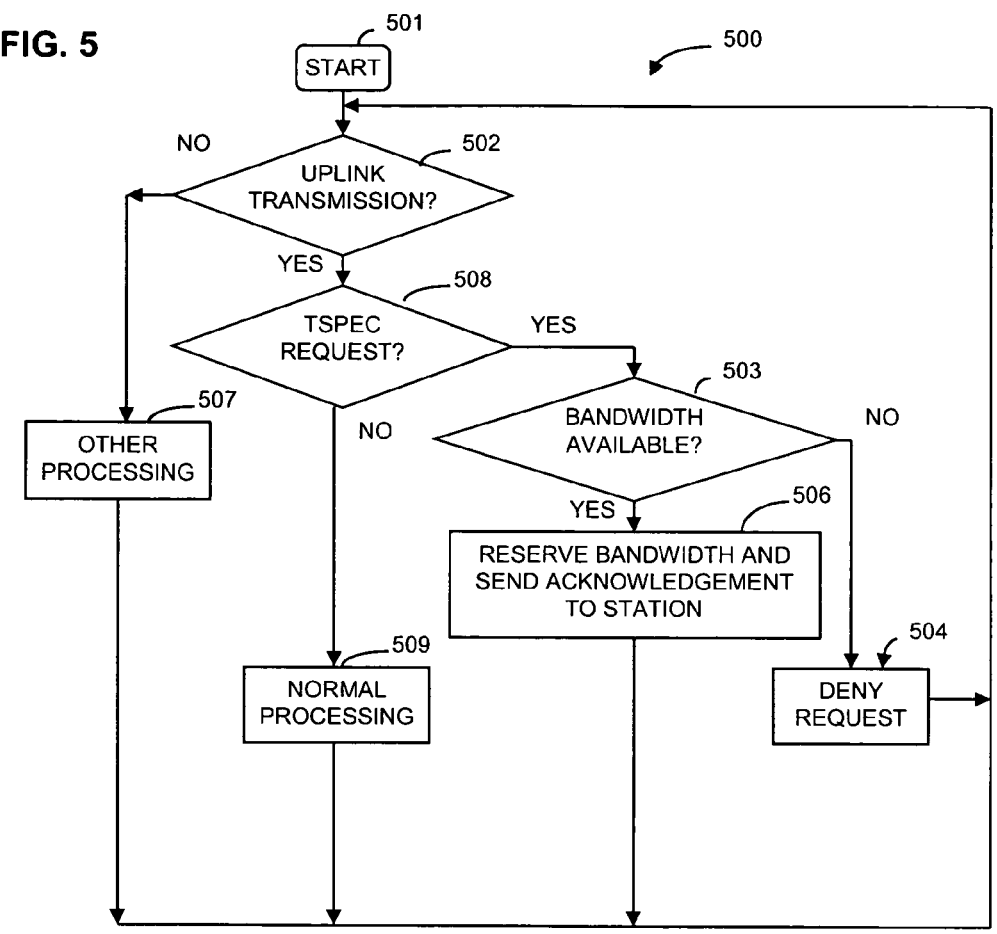
FIG. 5 illustrates, in flowchart form, an embodiment of operations performed by an access point.

FIG. 5 illustrates, in flowchart form, operations 500 that illustrate an embodiment of the operations performed by an access point in responding to a TSPEC request. After being started in block 501, decision block 502 determines if an uplink transmission has been received from a station. If the answer is yes in decision block 502, decision block 508 determines if a TSPEC request has been received from a station. If the answer is yes, decision block 503 determines if the requested bandwidth is available. If the answer is no, block 504 transmits a message to the station denying the request before transferring control back to decision block 502. If the answer in decision block 503 is yes, block 506 reserves the requested bandwidth and sends an acknowledgement message to the station before returning control back to decision block 502.

Returning to decision block 508, if the answer is no, block 507 performs other processing activities some of which may be illustrated in FIG. 6 before returning control back to decision block 502.

FIG. 6 illustrates, in flowchart form, operations 600 that illustrate an embodiment of the operations performed by an access point in responding to transmissions that are not TSPEC requests. After being started in block 601, decision block 602 determines if an uplink transmission has been received from a station. If the answer is yes, block 603 performs other processing which may include operations illustrated in FIG. 5 before returning control back to decision block 602.

Returning to decision block 602, if the determination is made in decision block 602 that the activity is not an uplink transmission, control is transferred to decision block 604 which determines if the operation is a downlink transmission that is being transmitted using the distributed access protocol. If the answer is no, block 606 performs normal processing before transferring control back to decision block 602. If the answer in decision block 604 is yes, decision block 607 determines if the downlink transmission is requesting use of a managed traffic class or a class having higher priority than the managed traffic class. If the answer is no, control is transferred to block 608 for normal processing before control is transferred back to decision block 602.

If the answer is yes in decision block 607, decision block 609 determines if the station that is to receive the downlink transmission has reserved bandwidth. If the answer is yes, control is transferred to block 613 which performs normal processing before returning control to decision block 602.

Returning to decision block 609, if the answer in decision block 609 is no, block 611 changes the class of the downlink transmission to be that of the highest priority non-managed traffic class. Then, control is transferred back to block 613. The operation of block 611 allows downlink frames (of a managed traffic class or a class having higher priority than the managed traffic class) destined to a legacy station to be demoted to the highest priority non-managed traffic class if the downlink frames where transmitted at a managed traffic class or a class having higher priority than the managed traffic class.

When the operations of a station or access point are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The station or access point can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. For example, the computer-readable medium can be, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance, via optical scanning of the paper or other medium, then compiled, interpreted or otherwise processed in a suitable manner if necessary, and then stored in a computer memory.

In an alternative embodiment, where the station or access point is implemented in hardware, the station or access point can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intended advantages. It is therefore intended that such changes and modifications be covered by the following claims except insofar as limited by the prior art.

What is claimed is:

1. A method for controlling access to a wireless network providing communication for a plurality of wireless traffic streams to assure quality of service for designated traffic, comprising the steps of:

assigning all communication of the designated traffic to use one of a plurality of priorities on the wireless network;

requiring that ones of the plurality of wireless traffic streams wanting to communicate using the one of the plurality of priorities and higher ones of the plurality of priorities and using a distributed medium access protocol submit bandwidth reservation requests to a wireless access point;

receiving a bandwidth reservation by one of the plurality of wireless traffic streams for communication from the wireless access point in response to a bandwidth reservation request upon bandwidth being available on the wireless network; and communicating by other ones of the plurality of wireless traffic streams using lower ones of the plurality of priorities without requiring bandwidth reservation requests.

2. The method of claim 1 further comprises the step of reassigning a priority of a communication designated as the one of the plurality of priorities or higher ones of the plurality of priorities received for one of the other ones of the plurality of wireless traffic streams to one of the lower ones of the plurality of priorities by the wireless access point.

3. The method of claim 2 wherein the reassignment is to the highest one of the lower ones of the plurality of priorities if the priority of the communication was for the designated traffic.

4. The method of claim 2 wherein the reassignment is to the highest one of the lower ones of the plurality of priorities if the priority of the communication was for the higher ones of the plurality of priorities.

5. The method of claim 1 wherein the designated traffic is for wireless telecommunication.

6. The method of claim 5 wherein the wireless network is interconnected to a wired telecommunication switching network.

7. The method of claim 1 wherein the designated traffic is for multimedia communication.

8. The method of claim 7 wherein the wireless network is interconnected to multimedia devices via a wide area network.

9. The method of claim 5 wherein all communication on the wireless network conforms to the IEEE 802 standard.

10. The method of claim 1 wherein distributed access protocols coexist with polled access protocols.

11. The method of claim 10 wherein the access protocols conform to the proposed IEEE 802.11e standard.

12. A method of controlling by a wireless access point access to a wireless shared communication channel by a plurality of wireless traffic streams to assure quality of service for managed traffic wherein access to the wireless shared communication channel is determined by a plurality of priorities, comprising the steps of:

designating one of the plurality of priorities to be used by a first set of the plurality of wireless traffic streams communicating managed traffic;

using by a second set of the plurality of wireless traffic streams ones of the plurality of priorities higher than the designated one of the plurality of priorities;

requiring the first and second sets of the plurality of wireless traffic streams using a distributed medium access protocol to submit bandwidth reservation requests to the wireless access point for access to the wireless shared communication channel;

granting by the wireless access point access to one of the first set of the plurality of wireless traffic streams in response to a bandwidth reservation request upon bandwidth being available on the wireless shared communication channel; and allowing access to the wireless shared communication channel by a third set of the plurality of wireless traffic streams using ones of the plurality of priorities lower than the designated one of the plurality of priorities without submitting bandwidth reservation requests.

13. The method of claim 12 further comprises the step of reassigning by the wireless access point received communication designated for one of the third set of the plurality of wireless traffic streams from a received one of the plurality of priorities equal to or higher than the designated one of the priorities to a new one of the plurality of priorities lower than the designated one of the plurality of priorities.

14. The method of claim 13 wherein the new one of the plurality of priorities is the highest one of the plurality of priorities lower than the designated one of the plurality of priorities.

15. The method of claim 14 wherein the managed traffic is wireless telecommunication.

16. The method of claim 12 wherein all of the plurality of wireless traffic streams may use polling and/or distributed access protocols.

17. The method of claim 16 wherein the access protocols conform to the proposed IEEE 802.11e standard.

18. The method of claim 12 wherein the managed traffic is for wireless telecommunication.

19. The method of claim 18 wherein the wireless network is interconnected to a wired telecommunication switching network.

20. The method of claim 12 wherein the managed traffic is for multimedia communication.

21. The method of claim 20 wherein the wireless network is interconnected to multimedia devices via a wide area network.

22. A processor-readable medium for controlling access to a wireless network providing communication for a plurality of wireless traffic streams to assure quality of service for designated traffic, comprising processor-executable instructions configured for:

assigning all communication of the designated traffic to use one of a plurality of priorities on the wireless network;

requiring that ones of the plurality of wireless traffic streams wanting to communicate using the one of the plurality of priorities and higher ones of the plurality of priorities and using a distributed medium access protocol submit bandwidth reservation requests to a wireless access point;

receiving a bandwidth reservation by one of the plurality of wireless traffic streams for communication from the wireless access point in response to a bandwidth reservation request upon bandwidth being available on the wireless network; and communicating by other ones of the plurality of wireless traffic streams using lower ones of the plurality of priorities without requiring bandwidth reservation requests.

23. The processor-readable medium of claim 22 further comprises processor-executable instructions for reassigning a priority of a communication designated as the one of the plurality of priorities or higher ones of the plurality of priorities received for one of the other ones of the plurality of wireless traffic streams to one of the lower ones of the plurality of priorities by the wireless access point.

24. The processor-readable medium of claim 23 wherein the reassignment is to the highest one of the lower ones of the plurality of priorities if the priority of the communication was for the designated traffic.

25. The processor-readable medium of claim 23 wherein the reassignment is to the highest one of the lower ones of the plurality of priorities if the priority of the communication was for the higher ones of the plurality of priorities.

26. The processor-readable medium of claim 22 wherein the designated traffic is for wireless telecommunication.

27. The processor-readable medium of claim 26 wherein the wireless network is interconnected to a wired telecommunication switching network.

28. The processor-readable medium of claim 22 wherein the designated traffic is for multimedia communication.

29. The processor-readable medium of claim 28 wherein the wireless network is interconnected to multimedia devices via a wide area network.

30. The processor-readable medium of claim 26 wherein all communication on the wireless network conforms to the IEEE 802 standard.

31. The processor-readable medium of claim 22 wherein all communication may use polling and/or distributed access protocols.

32. The processor-readable medium of claim 31 wherein the access protocols conform to the proposed IEEE 802.11e standard.

33. A processor-readable medium for controlling access to a wireless shared communication channel by a plurality of wireless traffic streams to assure quality of service for managed traffic and controlled by a wireless access point wherein access to the wireless shared communication channel is determined by a plurality of priorities, comprising processor-executable instructions configured for:

designating one of the plurality of priorities to be used by a first set of the plurality of wireless traffic streams communicating managed traffic;

using by a second set of the plurality of wireless traffic streams ones of the plurality of priorities higher than the designated one of the plurality of priorities;

requiring the first and second sets of the plurality of wireless traffic streams using a distributed medium access protocol to submit bandwidth reservation requests to the wireless access point for access to the wireless shared communication channel;

granting by the wireless access point access to one of the first set of the plurality of wireless traffic streams in response to a bandwidth reservation request upon bandwidth being available on the wireless shared communication channel; and allowing access to the wireless shared communication channel by a third set of the plurality of wireless traffic streams using ones of the plurality of priorities lower than the designated one of the plurality of priorities without submitting bandwidth reservation requests.

34. The processor-readable medium of claim 33 further comprises processor-executable instructions for reassigning by the wireless access point received communication designated for one of the third set of the plurality of wireless traffic streams from a received one of the plurality of priorities equal to or higher than the designated one of the priorities to a new one of the plurality of priorities lower than the designated one of the plurality of priorities.

35. The processor-readable medium of claim 34 wherein the new one of the plurality of priorities is the highest one of the plurality of priorities lower than the designated one of the plurality of priorities.

36. The processor-readable medium of claim 35 wherein the managed traffic is wireless telecommunication.

37. The processor-readable medium of claim 33 wherein all of the plurality of wireless traffic streams may use polling and/or distributed access protocols.

38. The processor-readable medium of claim 37 wherein the access protocols conform to the proposed IEEE 802.11e standard.

39. The processor-readable medium of claim 33 wherein the managed traffic is for wireless telecommunication.

40. The processor-readable medium of claim 39 wherein the wireless network is interconnected to a wired telecommunication switching network.

41. The processor-readable medium of claim 33 wherein the managed traffic is for multimedia communication.

42. The processor-readable medium of claim 41 wherein the wireless network is interconnected to multimedia devices via a wide area network.

43. A method of controlling access by a wireless access point to a wireless network to assure quality of service for designated traffic, comprising the steps of:
receiving a bandwidth reservation request from one of a plurality of wireless traffic streams using a distributed medium access protocol to use one of a plurality of priorities reserved for the designated traffic;
granting a bandwidth reservation to the one of the plurality of wireless traffic streams in response to the bandwidth reservation request; and
reassigning a received priority of a communication designating another one of the plurality of wireless traffic streams that had not been granted a bandwidth reservation to be less than the one of the plurality of priorities upon the received priority being equal too or greater than the one of the plurality of priorities.

44. The method of claim 43 wherein the designated traffic is for wireless telecommunication.

45. The method of claim 44 wherein the wireless network is interconnected to a wired telecommunication switching network.

46. The method of claim 43 wherein the designated traffic is for multimedia communication.

47. The method of claim 46 wherein the wireless network is interconnected to multimedia devices via a wide area network.

48. The method of claim 43 wherein all communication on the wireless network conforms to the IEEE 802 standard.

49. The method of claim 43 wherein all communication may use polling and/or distributed access protocols.

50. The method of claim 49 wherein the access protocols conform to the proposed IEEE 802.11e standard.

51. A processor-readable medium for controlling access to a wireless network to assure quality of service for designated traffic, comprising processor-executable instructions executed by a wireless access point configured for:
receiving a bandwidth reservation request from one of a plurality of wireless traffic streams using a distributed medium access protocol to use one of a plurality of priorities reserved for the designated traffic;
granting a bandwidth reservation to the one of the plurality of wireless traffic streams in response to the bandwidth reservation request; and
reassigning a received priority of a communication designating another one of the plurality of wireless traffic streams that had not been granted a bandwidth reservation to be less than the one of the plurality of priorities upon the received priority being equal too or greater than the one of the plurality of priorities.

52. The processor-readable medium of claim 51 wherein the designated traffic is for wireless telecommunication.

53. The processor-readable medium of claim 52 wherein the wireless network is Interconnected to a wired telecommunication switching network.

54. The processor-readable medium of claim 51 wherein the designated traffic is for multimedia communication.

55. The processor-readable medium of claim 54 wherein the wireless network is interconnected to multimedia devices via a wide area network.

* * * * *